Figure 1:
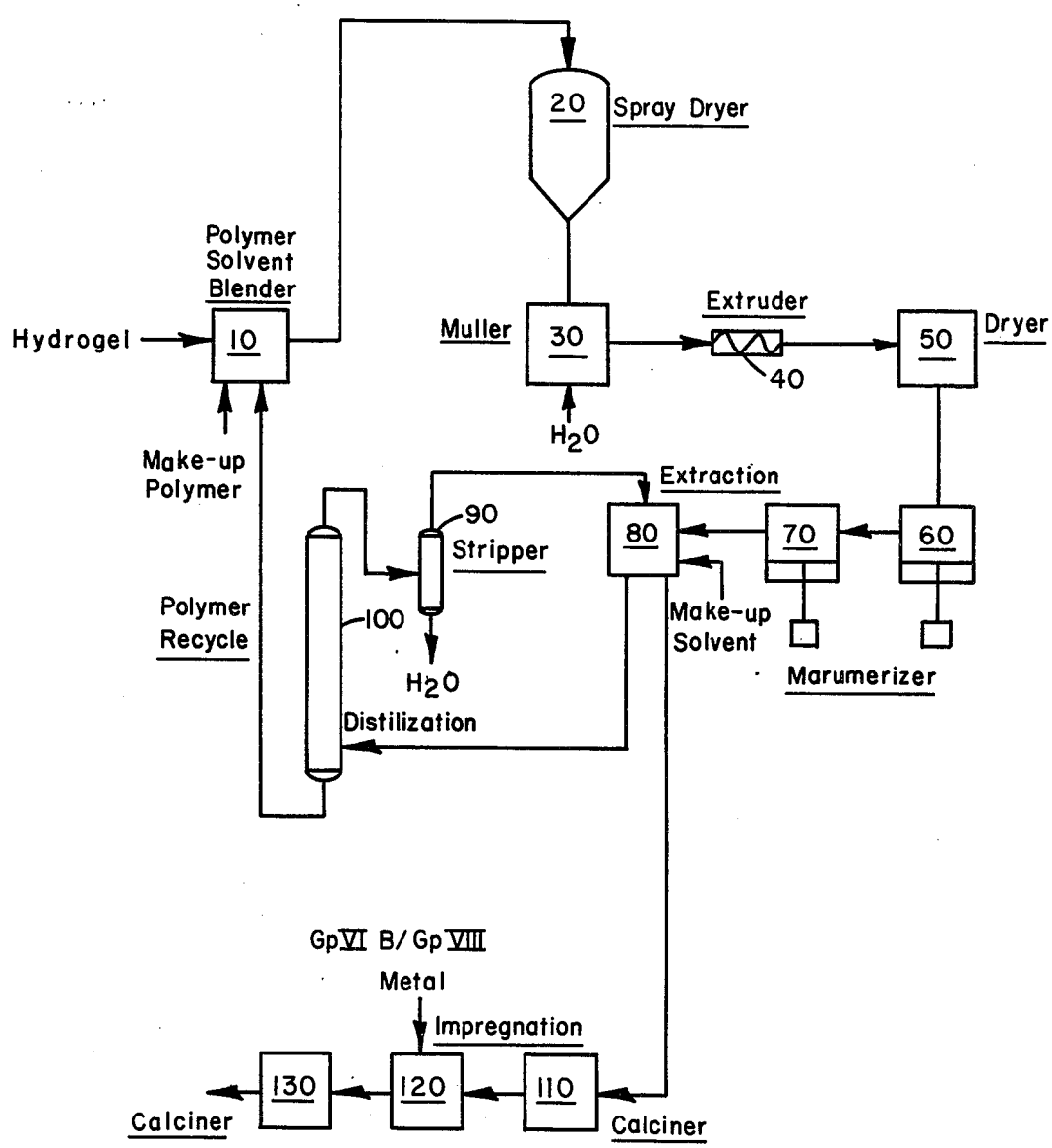

United States Patent [19]

Robson

[11] 4,145,316

[45] Mar. 20, 1979

[54] PREPARATION OF CATALYSTS OF PREDETERMINED PORE SIZE DISTRIBUTION AND PORE VOLUME

[75] Inventor: Harry E. Robson, Baton Rouge, La.

[73] Assignee: Exxon Research & Engineering Co., Florham Park, N.J.

[21] Appl. No.: 864,322

[22] Filed: Dec. 27, 1977

[51] Int. Cl.$^2$ .......................... B01J 21/04; B01J 23/24; B01J 23/40; B01J 23/74

[52] U.S. Cl. .................................... 252/465; 252/463; 252/466 J; 252/466 PT

[58] Field of Search .................... 252/463, 465, 466 J, 252/466 PT

[56] References Cited

U.S. PATENT DOCUMENTS 4,016,108  4/1977  Robson ............................ 252/465 X Primary Examiner—W. J. Shine Attorney, Agent, or Firm—Llewellyn A. Proctor

[57] ABSTRACT

A process for the treatment of a hydrogel by contact thereof with an aqueous solution containing from about 0.1 to 20 percent, by weight, of a water soluble mono- or polycarboxylic acid, preferably one which contains from 1 to about 12 carbon atoms, and more preferably from about 2 to about 8 carbon atoms. Suitably, the acid treatment can be incorporated with a wash step which removes the sulfates and other soluble salts, as well as the bayerite, or the acid treatment can be employed subsequent to a wash step, prior to, or simultaneously with a pore volume extending step. The hydrogel can thus be subsequently contacted and separately treated with the acid-containing aqueous solution to remove the bayerite, or the acid can be dissolved in a solution which also contains certain critical amounts of specified type of water soluble polymer in a pore volume extending step.

18 Claims, 3 Drawing Figures

RELATIONSHIP BETWEEN EXTRUDATE PARTICLE SIZE DIAMETER AND SPHERE DIAMETER

PREPARATION OF CATALYSTS OF PREDETERMINED PORE SIZE DISTRIBUTION AND PORE VOLUME

Aluminum oxide, or alumina, in various forms has been known for many years. Certain forms of alumina have proven outstanding for use as carriers or supports in the formation of catalysts, which are formed by compositing various metals, or mixtures of metals, with the alumina; and such catalysts have been widely used in the petroleum refining industry. Various forms of alumina occur in nature, and many forms have been synthetically produced. The synthetic forms of alumina are usually preferred because they can be prepared in very pure form, at controlled conditions, to provide particular physical characteristics. However, few processes are available for the formation of alumina of preselected, or controlled, pure size distribution with enlarged pore volume, particularly large pores of narrow pore size distribution with enlarged pore volume.

An established technique for the formation of alumina involves the precipitation of a hydrous form of alumina from solution by adding to an aqueous alkaline aluminate solution a quantity of an inorganic acidic compound having an anion that is soluble in an alkaline solution and forms an aluminum salt. For example, a solution of aluminum oxide trihydrate dissolved in a strong alkali, e.g., NaOH, added to a mineral acid or the aluminum salt of a strong mineral acid, e.g., $Al_2(SO_4)_3$, such that at the end point the solution is at pH ranging from about 8 to 12, generally from about 9 to 10, will cause the precipitation of a hydrous form of alumina from solution. The hydrous alumina solids which precipitate are then separated from the slurry generally by filtration, washed and then dried to form a solid powdery or glass-like material. In the past, generally, little consideration is given to the pore size distribution or pore volume of the final alumina product, and generally the total pore volume of such aluminas range below about 0.8 cc/g, most often between about 0.3 and about 0.6 cc/g.

A process of this general type is described in U.S. Pat. No. 3,417,028, but it differs from most other prior art processes in that a wide range of various types of additives is employed for control of pore volume and pore size distribution of the final alumina product. Pursuant to the disclosure, alumina of large pore volume is prepared by the addition of water soluble organic polymers which are either dissolved in the solution used to prepare the gel or dissolved or dispersed within the hydrous mass of gel after it has been precipitated. The water-soluble organic polymers are characterized as polyethylene glycols, polyethylene oxide, methyl cellulose ethers, polyvinyl alcohols, and polyacrylamides, which range from low molecular weight to very high molecular weight materials comprising compounds ranging from single monomer units to compounds comprised of several hundred monomer units, chiefly the latter. In accordance with this reference, the water-soluble organic polymers are added to the gels generally before the gel has been washed, the gel is dried, and then calcined. The pore size distribution of the final alumina products contains substantial pore volume in pore sizes ranging from about 20Å (Angstroms) to 20,000Å diameter, and higher. (Refer also to the Journal of Catalysis, Vol. I, Pages 547–563 [1962], "The Control of the Pore Volume and Pore Size Distribution in Alumina and Silica Gels by the Addition of Water-Soluble Organic Polymers," by Z. Basmadjian, G. N. Fulford, B. I. Parsons, and D. W. Montgomery.) Whereas the Patentees'0 efforts represented an early attempt to devise a method for controlling the pore volume and pore size distribution in alumina, the method nevertheless leaves much to be desired, inter alia, in that most of the pore volume is in the range of 1000Å diameter or greater and no procedure is given for concentrating pore volume in a particular range. Moreover, the polymers used as pore volume extenders are consumed in the calcination step and hence, due to the cost of the polymer, the process must be debited. Further, the smoke and fumes produced on burning the polymer during calcination creates additional burdens on the process.

In U.S. Pat. No. 3,977,961, issued Aug. 31, 1976; U.S. Pat. No. 3,977,962, issued Aug. 31, 1976; U.S. Pat. No. 3,993,598, issued Nov. 23, 1977; U.S. Pat. No. 4,014,821, issued Mar. 29, 1977; U.S. Pat. No. 3,989,645, issued Nov. 2, 1976; U.S. Pat. No. 3,993,599, issued Nov. 23, 1976; U.S. Pat. No. 3,985,684, issued Oct. 12, 1976; and U.S. Pat. No. 3,993,601, issued Nov. 23, 1976, the disclosures of which are herewith incorporated by reference, there is described a novel method for the preparation of catalysts from alumina having properties inclusive of a large number of pores in the 100–275Å pore size diameter range, and very high pore volume. These catalysts, which are prepared from alumina formed by neutralization of an aluminum salt solution with ethylene oxide at controlled conditions, are particularly useful in the production of clean liquid products by the hydroconversion of the 1050° F.+ materials contained in unconventional heavy crudes and residua, which materials are particularly difficult to treat because they have (1) very high Conradson carbon (i.e., "Con carbon") or carbon-hydrogen ratios (i.e., relatively high carbon and low hydrogen content), (2) very high metals content, particularly as regards the amount of nickel and vanadium, (3) are ultra-high in their content of materials boiling above 1050° F., e.g., asphaltenes, and (4) contain considerable amounts of sand and scale.

Whereas these catalysts have proven admirably satisfactory for the hydroconversion of whole heavy crudes and residua, previous methods for the production of such catalysts nevertheless left something to be desired. Accordingly, a new method for the production of such catalysts was developed as disclosed in U.S. Pat. Nos. 4,016,106; 4,016,107; and 4,016,108 all of which were issued on Apr. 5, 1977. These patents disclose a process for the formation of catalysts of the desired predetermined pore size distributions and pore volumes by precipitation and formation of an alumina hydrogel from a solution which contains a hydrous form of alumina in 1–5 wt. % concentration, and an anion that is soluble in an alkaline solution and forms an aluminum salt, at pH ranging about 8–12, and at temperature ranging about 15° F. –120° F. The alumina hydrogel, pursuant to such process, is separated from the solution and then washed in a pore volume extending step by contact with a solution of a water soluble polymer containing from about 2 to about 24 monomer units from the group consisting of (a) polyethylene glycols, (b) polypropylene glycols, and (c) polyethylene amines sufficient to absorb the polymer into the pores of the alumina hydrogel and displace water from the pores until the weight ratio of polymer:alumina within the hydrogel ranges from about 0.5:1 to about 4:1. Metal hydrogenation components, suitably a Group VI-B or Group VIII metal, or both, are then added during the hydrogel formation step (i.e., by cogellation), during the pore volume extending step, or after the alumina is formed, dried and calcined.

Despite the success of this method for the production of a precursor alumina capable of forming catalysts having high pore volume, and narrow uniform pore size distribution as defined by the cited patent art the hydrogel is found to comprise an admixture of boehmite, $Al_2O_3 \cdot H_2O$, and bayerite, $Al_2O_3 \cdot 3H_2O$; and, it has now been found that the presence of the bayerite produces a hydrogel which, on calcination, often produces an alumina of pore structure of lesser quality than that produced by a hydrogel otherwise similar except that it is substantially free of the bayerite. Conversely stated, the pore structure of the alumina produced by calcination of the hydrogel boehmite is superior to that formed by calcination of a hydrogel which contains a relatively high concentration of the bayerite. It has thus been found that the presence of the bayerite within the hydrogel in excess of about twenty weight percent essentially always adversely affects the pore structure of the catalyst produced therefrom, and results in a chalky base of poor crush strength. Moreover, even in concentration within the catalyst of about ten weight percent, quality control problems are presented, particularly as relates to the formation of catalysts having generally optimum characterization. When the bayerite is reduced well below this level, or its presence substantially eliminated from the hydrogel, good crush strength is achieved, and good pore structure results. Whereas the bayerite concentration of a hydrogel can be reduced by adding a greater concentration of aluminum sulfate to the solution from which the hydrogel is precipitated to lower the pH, e.g., to a pH = 7, this is undesirable because it also reduces boehmite crystallinity and increases the residual sulfate in the washed hydrogel.

It is, accordingly, a primary objective of the present invention to obviate this problem, and provide a further, improved method for the preparation of catalysts particularly useful in hydrocarbon conversion reactions, especially reactions involving the hydroconversion of the 1050° F.+ hydrocarbon portion of heavy crudes and residua.

A further object is to supply a further, improved method for the preparation of catalysts useful in converting the 1050° F.+ hydrocarbon portion of feeds comprising heavy crudes and residua to useful lower boiling products while simultaneously producing appreciable Conradson carbon (Con. carbon) reduction, hydrodesulfurization, hydrodenitrogenation and demetallization of the feeds.

A further, and more specific object is to provide a method for improving the quality of the catalysts by improving the quality of the hydrogel by lowering the bayerite concentration thereof such that, on calcination, an alumina of improved pore structure, and crush strength is produced with consistancy.

These and other objects are achieved pursuant to the practice of the present invention which comprises a process for the treatment of a hydrogel by contact thereof with an aqueous solution containing from about 0.1 to about 20 percent, preferably from about 2 to about 10 percent, by weight, of a water soluble mono- or polycarboxylic acid, preferably one which contains from 1 to about 12 carbon atoms, and more preferably from about 2 to about 8 carbon atoms, whether straight chain or branched chain, cyclic or acyclic, saturated or unsaturated, and whether substituted or unsubstituted. Exemplary of such acids are formic acid, chloroethanoic acid, propionic acid, 3-butenoic acid, valeric acid, oxalic acid, succinic acid, maleic acid, phthatic acid, trimellitic acid, and the like. Suitably, the acid treatment can be incorporated with a wash step which removes the sulfates and other soluble salts, as well as the bayerite, or the acid treatment can be employed subsequent to a wash step, prior to, or simultaneously with a "pore volume extending step". Thus, the hydrogel can be subsequently contacted and separately treated with the acid-containing aqueous solution to remove the bayerite, or the acid can be dissolved in a solution which also contains a water soluble polymer containing from about 2 to about 24, preferably from about 4 to about 8 monomer units, which is selected from the group consisting of (a) polyethylene glycols, (b) polypropylene glycols, and (c) polyethylene amines. In the pore volume extending step the water of the hydrogel is exchanged or replaced by the polymer solution, the treatment being continued with the polymer solution after initial contact sufficient to add polymer to the hydrogel in polymer:alumina concentration ranging from about 0.5:1 to about 4:1, preferably from about 1:1 to about 2:1. Relatively large pore volume and large pore sizes are favored by high polymer:alumina concentrations, and relatively low pore volume, somewhat smaller pore sizes are favored by low polymer:alumina concentrations. Whereas the mechanism of the reaction is not entirely understood, and there is no desire to be bound by any specific theory, apparently the incorporation of the polymer suppresses contraction of the pores developed within the hydrogel during the necessary catalyst preparation steps. Removal of bayerite improves crush strength and improves the quality of the hydrogel as a precursor for the production of catalysts of higher pore volume, and narrow uniform pore size distribution.

In a preferred embodiment the process, more specifically, is one involving the following steps:

(1) Alumina, as a hydrogel, is precipitated from an alkaline solution at a pH ranging from about 8 to 12, preferably 9 to 10, by adding to a hydrous form of alumina in aqueous alkaline solution, an inorganic acid or aluminum salt of an inorganic acid constituted in part of an anion soluble in an alkaline medium. The alumina is normally precipitated by combining solutions, (a) a first of which contains an alkali metal aluminate, e.g., $NaAlO_2$, and (b) a second of which contains a strong mineral acid or an aluminum salt of a strong mineral acid, the anion portion of which is soluble in an alkaline solution, e.g., $Al_2(SO_4)_3$. Neutralization of an aluminum nitrate-nitric acid solution, or an aluminum chloride-hydrochloric acid solution, with ammonium hydroxide has been found to produce a hydrogel of outstanding quality. Hydrolysis of the aluminum salts in this manner has been found to improve the response to the polymer extension agents, perhaps through delay of boehmite crystallization until a structure has developed in the precursor material which will result in the production, in the finished catalyst, of the desired narrow uniform pore size distribution. Moreover, the presence of residual $Na^+$ and $SO_4^=$ in the alumina product is avoided. Silica can be added, if desired, to ultimately produce a "glassy" alumina or to increase the resistance of the catalyst to sintering. The temperature of precipitation ranges generally from about 15° F. to about 120° F., and preferably from about 32° F. to about 70° F. Suitably, the concentration of alumina contained within the sum-total of the solution ranges from about 1 to about 5 weight percent, preferably from about 2 to about 3 weight percent.

A catalytically active amount of a metal hydrogenation component, or metal hydrogenation components, suitably a Group VIB or Group VIII metal (preferably a non-noble metal), or both (Periodic Table of the Elements, E. H. Sargent and Co., copyright 1962 Dyna-Slide Co.), can be incorporated into the hydrogel during the precipitation step, if desired, by the addition of soluble compounds, or salts, of such metals to the solutions before combination. For example, molybdenum can be incorporated into the hydrogel by adding sodium molybdate or molybdic acid to the $NaOH-NaAlO_2$ solution. Tungsten can be incorporated by adding $WO_3$ or $Na_2WO_4$ to this solution. Likewise, cobalt can be incorporated by adding $CoSO_4$ to the $Al_2(SO_4)_3$ solution, or nickel by adding $NiSO_4$.

(2) The precipitated alumina hydrogel, a micro-crystalline substance, in a gel matrix, ranging from about 30Å to about 40Å in crystallite size, is preferably washed with water or aqueous solution, suitably at ambient temperature or temperatures ranging from about 70° F. to about 85° F., to remove essentially all of the soluble salt, e.g., $Na_2SO_4$. The removal of a large part of the sulfate from the alumina hydrogel is essential to achieve high surface area and good catalytic activity in the finished catalyst, and preferably essentially all of the sulfate is removed from the hydrogel.

(3) In the acid treat step, an aqueous solution containing from about 0.1 percent to about 10 percent, preferably from about 1 to about 5 percent of a monocarboxylic acid, or polycarboxylic acid, based on the weight of the alumina, is contacted with the hydrogel at temperatures ranging from about 70° F. to about 85° F., to dissolve the bayerite and reduce its concentration in the hydrogel. Essentially all of the bayerite can be removed from the hydrogel by a thorough acid treat, which can be employed as a separate step or in conjunction with the wash step (2), or pore volume extending step (4).

(4) In the pore volume extending step, a pore volume extending agent comprising a water-soluble polymer containing from about 2 to about 24 monomer units, preferably from 4 to about 8 monomer units, from the group consisting of (a) polyethylene glycols, (b) polypropylene glocols, and (c) polyethylene amines is then added to the partially washed hydrogel, suitably during the washing step (2), or acid treat step (3), or both, or the hydrogel further contacted and washed with a solution of the polymer in a distinct step. In either event, the hydrogel is contacted with an aqueous solution containing from about 10 weight percent to about 20 weight percent, and preferably from about 15 weight percent to about 20 weight percent of the polymer, such that the polymer solution is absorbed into the pores of the hydrogel. Suitably, the hydrogel is contacted or washed at ambient temperature, or at a temperature ranging from about 70° F. to about 85° F.

The final pore volume, and pore volume distribution, of the finished alumina is principally determined by the amount of polymer, or pore volume extender, added to the hydrogel during the pore volume extending step. In contacting or washing the hydrogel, the water within the hydrogel is displaced by polymer solution, and the more concentrated the polymer within the solution the greater the amount thereof which can be exchanged into the hydrogel. Preferably, the water is displaced until the weight ratio of polymer:alumina within the hydrogel ranges from about 0.5:1 to about 4:1, and preferably from about 1:1 to about 2:1. Suitably, the exchange is accomplished by blending the components, stirring and filtering, with repetition of these steps until the hydrogel contains the desired amount of polymer, or by initial filtration of the gel with subsequent washing of the gel with polymer solution while the gel is contained on the filter.

A catalytically active amount of a metal hydrogenation component, or metal hydrogenation components, suitably a Group VIB or Group VIII metal (preferably a non-noble metal), or both (Periodic Table of the Elements, E. H. Sargent and Co., copyright 1962 Dyna-Slide Co.), can be incorporated into the hydrogel during the pore volume extending step, if desired, by the addition of soluble compounds, or salts, of such metals. Molybdenum of Group VIB and cobalt or nickel of Group VIII are preferred metals, particularly an admixture of these metals. Preferably, however, the hydrogenation component, or components, is added subsequent to calcination of the material, as subsequently discussed.

(5) The polymer containing hydrogel is dried, suitably at temperatures ranging from about 85° F. to about 350° F., and preferably from about 212° F. to about 250° F., to form a gel. In this step, the pore structure of the hydrogel is set and the hydrogel converted into boehmite. The boehmite, after drying, exists as a granular substance which can, by proper adjustment of its solids (or liquid) content, be formed into various shapes, e.g., extrudates or spheres, calcined and then impregnated with a hydrogenation component, or components, if not already impreg-nated with a metal hydrogenation component, or components, (6) The dried boehmite can then (a) be calcined at temperatures ranging from about 570° F. to about 1110° F., or higher, preferably from about 840° F. to about 1020° F., at which time the added polymer is decomposed and evolved, or removed as gases and smoke, or preferably (b) contacted with a low molecular weight water-soluble organic solvent at temperatures ranging from about 140° F. to about 285° F., preferably from about 175° F. to about 230° F., to remove the polymer, and then calcined. After calcination, which converts the boehmite to gamma alumina, a metal hydrogenation component, or components, can be added to the gamma alumina base by impregnation, if the hydrogenation component, or components, has not already been added during the gelling step or the pore volume extending step, supra.

Spherical shaped catalysts have been found particularly useful in the hydroprocessing of unconventional whole heavy crudes and residua, particularly spherical catalysts ranging from about 1/50 to about ⅛ inch, preferably from about 1/32 to about ⅛ inch, and more preferably from about 1/32 to about 1/16 inch particle size diameter. Pursuant to the practice of this invention, catalysts in the shape of very smooth hard spheres can be formed. These catalysts are particularly useful as fixed beds in hydroprocessing processes, largely because of the uniformity and roundness of the particles which considerably reduce pressure drop as contrasted with the use of catalyst spheres of more irregular shape which tend to pack more closely together. The catalysts are also especially suitable for use in fluidized or ebullating beds. The diffusion limitations concomitant to the hydroprocessing of the high metals content whole heavy crudes and residua are largely overcome, pore blockage is suppressed, and there is a significant beneficial effect in the ability of the smaller particle size catalyst to desulfurize, demetallize, and denitrogenate such feeds. High concentrations of the metals, notably nickel and vanadium, are removed from such feeds during the hydroconversion reaction, and yet good catalyst activity maintenance is achieved. A high rate of hydro-desulfurization is attained. Catalysts, formed as extrudates, also prove very useful in the hydroprocessing of these unconventional whole heavy crudes and residua.

In all of the catalysts of this invention, there is a definite relation between particle size and pore size. The catalysts of this invention include a combination of properties, comprising, when the catalyst is of size ranging from about 1/50 inch up to 1/25 inch average particle size diameter, at least about 15 percent, preferably at least about 20 percent, and more preferably at least about 45 percent, of its total pore volume of absolute diameter within the range of about 150Å to about 250Å; when the catalyst is of size ranging from about 1/25 inch to about ⅛ inch average particle size diameter, at least about 15 percent, preferably at least about 20 percent, and more preferably at least about 30 percent, of its total pore volume of absolute diameter within the range of about 175Å to about 275Å; wherein, in each of these catalysts of differing ranges of particle size distributions, the pore volumes resultant from pores of 50Å, and smaller, i.e., 50Å−, are minimized; and preferably, in the catalysts of average particle size above 1/50 inch, the pore volume resultant from pores above 350Å, i.e., 350Å+, is minimized; the surface areas and pore volumes of the catalysts being interrelated with particle size, and pore size distributions, surface areas ranging at least about 200 m²/g to about 600 m²/g, and preferably at least about 250 m²/g to about 450 m²/g, with pore volumes ranging from about 0.8 to about 3.0 cc/g, and preferably from about 1.1 to about 2.3 cc/g (B.E.T.).

In their optimum forms, the absolute pore size diameter of the catalyst, dependent on particle size, is maximized within the 150-250Å, and 175-275Å ranges, respectively. It is not practical, of course, to eliminate the presence of all pores of sizes which do not fall within these ranges, but in accordance with this invention, it is practical to produce catalyst particles, inclusive of those of spherical shape, having absolute pore size diameters highly concentrated within these desired ranges. The following tabulations show the pore size distributions, as percent of total pore volume, of marginal and preferred catalysts of this invention:

| Distribution of Pore Diameters[1] | Marginal | Preferred | Preferred |
|---|---|---|---|
| 1/50 up to 1/25"[2] | | | |
| 0-50Å | <10% | <5% | <1% |
| 150-250Å | >15% | >20% | >45% |
| 350Å+ | <35% | <30% | <7% |
| Pore Volume, cc/g | 1.1-1.7 | 1.3-1.9 | 1.5-2.1 |
| Surface Area, m²/g | 320-475 | 340-575 | 360-600 |
| 1/25 up to 1/8"[2] | | | |
| 0-50Å | <5% | <4% | <3% |
| 175-275Å | >15% | >20% | >30% |
| 350Å+ | <40% | <35% | <25% |
| Pore Volume, cc/g | 1.3-1.9 | 1.5-2.1 | 1.8-2.3 |
| Surface Area, m²/g | 340-500 | 350-600 | 370-650 |

[1] Measured by nitrogen adsorption isotherm, wherein nitrogen adsorbed is at various pressures. Technique described in Ballou et al, Analytical Chemistry, Vol. 32, April, 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.
[2] Average particle diameter in inches.

These and other features of the invention will be better understood by reference to the attached drawings, and to the following detailed description of a highly preferred process for the preparation of spherical catalysts in accordance with this invention. In the description, specific reference is made to the drawings.

In the drawings:

FIG. 1 schematically depicts a preferred flow plan, starting with the blending of the hydrogel and the polymer containing solvent and ending with the finished catalyst.

Figure 2:
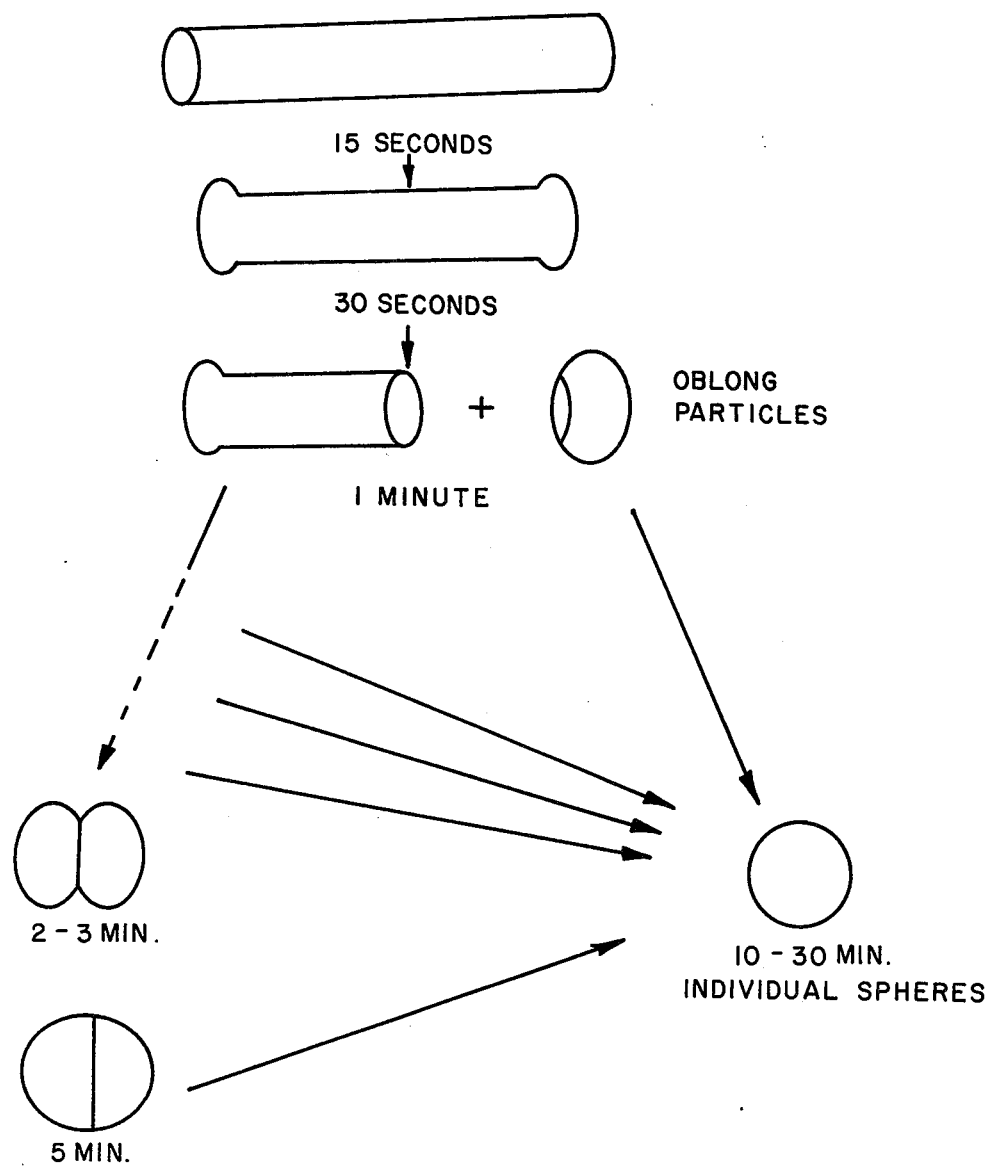

FIG. 2 schematically depicts the formation of spheres from extrudates, of cylindrical shaped boehmite paste of critical solids content.

Figure 3:
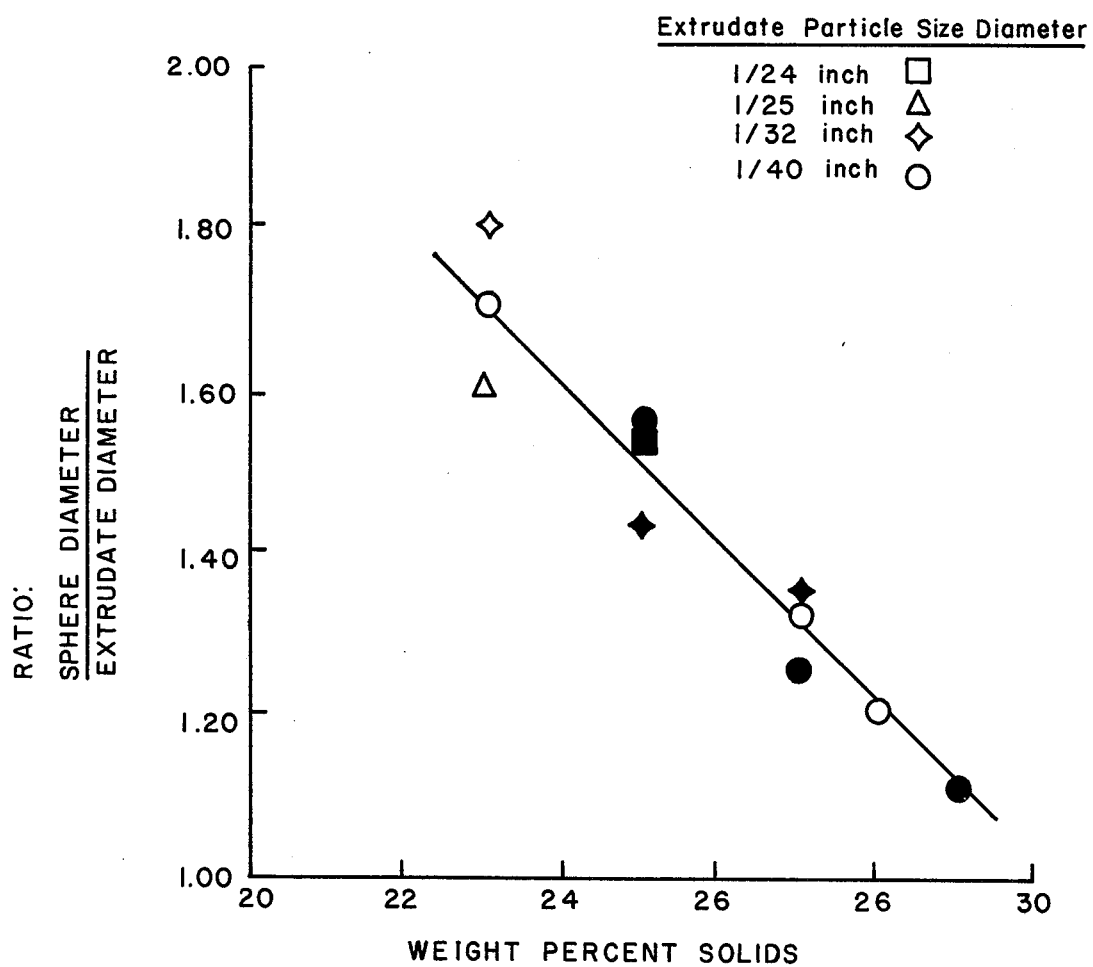

FIG. 3 graphically depicts the relationship between sphere diameter and extrudate diameter as a function of solids content in the formation of spheres from extrudates of critical solids content.

Referring generally to FIG. 1 for an overview of the process, there is depicted a flow plan suitable for use in the formation of alumina extrudates or spheres comprising the combination of a blender 10 wherein a previously washed, acid treated, moist alumina hydrogel, as formed in Steps 1 through 3, supra, is blended with makeup polymer and recycle polymer for displacement of water and incorporation of polymer within the hydrogel is reduced to microspherical form, the pore size set and the hydrogel converted to essentially boehmite; a muller 30 wherein water is added to the microspherical boehmite to physically convert the latter to a paste of extrudable consistency; an extruder 40 wherein the granulated boehmite is extruded through an aperture or die; and, an extrudate drier 50. For use in the formation of spheres (which are formed from extrudates) there is also provided a series of marumerizers 60,70 wherein the extrudates are broken, fragmented and formed into spheres. Extrudates from drier 50, or spheres from the marumerizers 60,70, are passed to an extraction stage, or extractor 80, wherein the polymer is separated from the extrudates or spheres, and the solvent and polymer are recovered. In the extraction of the solvent and polymer, the extrudates from drier 50, or spheres from the series of marumerizers 60,70, are initially contacted with fresh or recycle solvent from the stripping column 90, and the used solvent and microspherical boehmite then separated one from the other. The used solvent is then passed to distillation column 100 wherein polymer is recovered from the bottom of the column and recycled to the blender 10. Overhead from the distillation column 100, principally solvent and water are then passed to stripper 90 wherein solvent is removed from the stripper 90 and passed to the extractor 80, and water is also rejected from the stripper. (In some instances it may also be desirable to extract polymer from the dried solids prior to the formation of spheres or extrudates. In such case the product from blender 10 is dried in spray drier 20, or a low temperature drier. The dried product is then contacted in extractor 80, and the extracted product recycled to muller 30 for treatment in the sequence of steps described. Product from the marumerizer 70 would then be dried, and directed to calciner 110.) The recovered granulated boehmite solids from extractor 80 are passed to a first calciner 110 wherein the boehmite is converted to gamma alumina. Gamma alumina from calciner 110, in the more preferred embodiment, is then impregnated in impregnation stage 120, with the desired Group VIB or Group VIII metal, or preferably an admixture of Group VIB and Group VIII metals, and then dried and further calcined as in the second calciner 130, from where the finished catalyst is removed.

Within the blender 10, a solution of the desired water soluble polymer is blended with sufficient of a recycle stream from the distillation column 100 to displace water and add polymer to the alumina hydrogel in polymer:alumina ratios ranging from about 0.5:1 to about 4:1, preferably from about 1:1 to about 2:1, based on weight, at generally ambient temperature and pressure, suitably at temperatures ranging from about −0° F. to about 85° F. Makeup polymer can be added, if required. The hydrogel is removed from the blender 10 as a slurry, suitably a pumpable slurry and, if necessary, excess water-polymer solution or water is added for such purpose.

In some instances, as suggested, it may be desirable to add the catalytic metals during this blending step by impregnation of the hydrogel. It is desirable during hydrogel impregnation that the pH of the blend be maintained in excess of 10 to avoid unwanted precipitation of the catalytic metals. A catalytically active amount of the metal hydrogenation component, or components, suitably a Group VIB or Group VIII metal (preferably a non-noble metal) or both, can be incorporated into the hydrogel. Compounds of cobalt or nickel, including the halide, nitrate, acetate, or the like, can be utilized. To avoid excessive pore volume loss, however, it is preferred that the halide not be used. Compounds of molybdenum or tungsten, including the ammonium salts (e.g., ammonium molybdate) and phosphomolybdic acid (or phosphotungstic acid) and the like can be used. The compounds should be mutually water-soluble at pH > 10 to avoid undesired precipitation. With this type of impregnation, it is desirable to dry the hydrogel at low temperature (150°–250° F.) especially to avoid breakdown of the polymer. This material can be then extracted with a water-soluble organic material (e.g., alcohols). In this case, it is preferred to use a $C_4$ or higher alcohol to avoid extraction of the catalytic metals. Further treatment of the catalyst involves forming (e.g., extrusion and marumerization) followed by calcination.

Spray drier 20 is employed to convert the hydrogel to boehmite, and form the required pore structure. Suitably, the hydrogel is spray dried, i.e., dried by countercurrent contact of an atomized hydrogel spray with air, at air temperatures ranging from about 250° F. to about 350° F., and preferably at temperatures ranging from about 275° F. to about 300° F. Relatively low temperatures are desirable to minimize oxidation, and to avoid decomposition and loss of polymer. The temperature of the hydrogel or boehmite per se is maintained below about 250° F., and preferably from about 225° F. to about 250° F. Pressures are not critical, and generally atmospheric or near atmospheric pressure is employed. The spray drier per se is conventional, nozzles of various commercial types being suitable for ejection of the hydrogel paste or slurry as a spray. On egress of the granulated boehmite from the spray drier 20 the microspherical solids range in average particle size diameter from about 75 to about 125 microns. Generally, the spray dried material contains from about 30 to about 35 weight percent alumina, from about 30 to about 60 weight percent polymer, and from about 5 to about 40 weight percent water.

Generally, the spray drying step removes too much moisture from the granules and therefore it is necessary to add a liquid, suitably water, to form an extrudable homogeneous paste. This is accomplished within the muller 30. The solids content of the paste leaving the muller 30 is critical, and hence the amount of water added is somewhat critical. If, on the one hand, too much water is added, it is impractical to extrude the material because it becomes too sticky, and beyong this point it becomes impossible to form an extrudable solids phase. On the other hand, if too little water is present, the material cannot be extruded without significant loss of pore volume, and degradation of the pore size distribution. To avoid excessive pore volume loss, it is desired to minimize the water content of the extrusion paste to approximately 50–60% which corresponds to >20 weight percent solids, preferably >22 weight percent solids, albeit added water facilitates the expression of the paste through the die apertures. On the other hand, however torque increases exponentially as the solids content of the paste is increased above about 25 weight percent, which also tends to decrease pore volume.

The solids content of the paste is regulated within the muller 30 for reasons stated, but to some degree the solids content is regulated to produce the desired particle size of the spheres. In general, the relation between the solids content of the paste, the required extrudate diameter, and the average spherical particle size diameter is as follows:

| Solids Content of the Paste, Wt.% | Required Extrudate, Diameter, Inches | Average Sphere Size Diameter, Inches |
|---|---|---|
| 26–28 | 1/55–1/28 | 1/50–1/25 |
| 24–26 | 1/32–1/21 | 1/25–1/16 |
| 22–24 | 1/24–1/12 | 1/16–1/8 |

As will be discussed later in reference to forming spheres from extrudates (FIG. 3), several factors are important for forming extrudates. First, the smallest extrudates that can be formed without excessive torque and concomitant crushing of the pores is about 1/40–1/55 inch. Thus, to form 1/50–1/25 inch spheres it is necessary to have a minimum increase of sphere diameter compared to extrudate diameter. This requires that the spheres be formed at high weight % solids (e.g., 28–30%). The optimum change in weight on drying of extrudates is 2–3 Wt.% which means that the extrudate must be formed from paste containing 26–28% solids. In addition, 1/58–1/28 inch dies must be used to form the 1/25–1/50 inch spheres. In forming 1/25–1/16 inch spheres it is desirable to increase the extrudate size to 1/32–1/16 inch to minimize torque and pore crushing. As shown by reference to FIG. 3, it is apparent that the weight % solids in the extrusion paste shall be 24–26%. Finally, to form 1/16–⅛ inch spheres it is necessary to use pastes containing 22–24 Wt.% solids. It is undesirable to use pastes of solids content significantly below this level since the extrudates that are formed will have poor crush strength. Thus, at this level, FIG. 3 indicates that 1/24–1/12 inch extrudate will be required for making 1/16–⅛ inch spheres.

The paste from the muller 30, containing the desired amount of solids, is conveyed as a substantially homogeneous mass to the extruder 40 for formation of the paste into extrudates. In forming extrudates, the boehmite paste is extruded through a die, suitably one having a plurality of apertures to form "spaghetti," or spaghetti-like shapes. Excessive torque must be avoided in the extrusion to avoid loss of pore volume and degradation of the pore size distribution by distortion or crushing of the pores. The smaller the die apertures the greater, of course, the force required to effect the extrusion and, whereas the reduction of the solids content of the paste (by water addition at the muller 30) lessens the amount of force that must be applied, there is, as stated, a limit on the amount of water that can be added (or solids reduced) because excessive water also causes loss of pore volume and pore size distribution during extrusion as well as loss of crush strength. In general, with conventional extrusion equipment, e.g., a low torque extruder, Model 0.810 Research Extruder manufactured by Welding Engineers of King of Prussia, Pa., extrudates of outstanding quality of cross-sectional diameters ranging from about 1/40 to 1/16 inch have been produced.

The cross-sectional diameter of the extrudate is preselected to provide an extrudate of the desired diameter, or the desired sphere sizes, a sphere being of somewhat larger particle size diameter, generally from about 10 percent to about 50 percent larger than the diameter of the extrudate from which it is produced. The difference between sphere diameter and extrudate diameter is primarily dependent upon the weight percent solids of the paste from which the extrudate is formed, which relationship will be better understood by a consideration of the mechanism involved in the formation of spheres from extrudates, subsequently discussed.

Extrudates are next dried in drier 50, suitably a circulating air oven, at temperature ranging from about 150° F. to about 300° F., preferably from about 175° F. to about 225° F. at residence time sufficient to form extrudates of critical solids content above about 20 weight percent, suitably within a range of from about 20 to about 30 weight percent, preferably within a range of from about 22 to about 30 weight percent, and more preferably from about 25 to about 28 weight percent.

In the formation of spheres, where spheres are the desired catalyst form, the extrudates, of critical solids content, are next fed batchwise or continuously, preferably the latter, to a series of two or more marumerizers 60,70. The first marumerizer 60 of the series is provided with a rotatable roughened plate suitably of grid design for breaking up the extrudates which initially form into "dumbbell" shapes, which gradually and progressively separate into spheres, and the second marumerizer 70 is provided with a smooth rotatable plate for smoothing the surfaces of the preformed spheres. Suitably marumerizers for such purpose are avialable commercially, e.g., a Q-230 model made by Eli Lily. A suitable grid is one described as 1.5 mm. friction plate as described in the Marumerizer and Extruding Equipment Operating Manual published by Equipment Sales Dept., Elanco Products Co. of Indianapolis, Ind., and a suitable smooth plate is one characterized as a polishing plate described in the same publication.

In the operation of marumerizers 60,70, dry spaghetti-like extrudates are dropped onto the revolving grid plate of marumerizer 60, and after a suitable residence time the spheres are passed into marumerizer 70 to finish the formation of the spheres. The function of the marumerizers 60,70 is illustrated by reference to FIG. 2 which shows schematically the progression of an extrudate segment formed into spheres. The time required for marumerization is a direction function of the solids content of the extrudate, the speed of rotation of the plates of the marumerizers 60,70 and type of plates used.

Typically, the time required for marumerization ranges from about 10 minutes to about one-half hour. In the figure there is depicted a typical formation of spheres from a single fragment of extrudate, over a typical time period from the initial time that an extrudate has been introduced into the series of marumerizers 60,70. Initially, an extrudate is broken into a plurality of segments having length:diameter ratios ranging from about 8:1 to about 10:1. Within, e.g., about 15 seconds a first dumbbell shape is formed from a segment, and after about 30 seconds one or more of the ends of the dumbbell are broken off and formed into spheres. The process is continued until finally a short dumbbell segment, or double sphere, is formed into a single sphere which generally occurs within from about 2 to about 5 minutes. Generally, from about 6 to about 8 spheres are formed from an original extrudate segment. The spheres ae somewhat irregular in shape when contacted with the plate of marumerizer 60, but are rounded off to become smooth, uniform spheres in marumerizer 70 where they are buffed upon the smooth plate.

The size of the spheres formed is a function of the extrudate diameter and the weight percent solids. Referring to FIG. 3, there is graphically depicted the relationship between several extrudates of solids content ranging from about 20 to 30 weight percent, and of extrudate sizes ranging 1/24 inch, 1/25 inch, 1/32 inch and 1/40 inch particle size diameter (die size), respectively, marumerized at 970 rpm until spherical. The ratio of the sphere diameter:extrudate diameter is plotted on the y-axis, and weight percent solids of the paste used to form the extrudate is plotted on the x-axis for each of the several specimens. It will be observed that as the weight percent of solids of the paste is increased, the sphere diameter approaches the extrudate diameter.

The spheres, or extrudates, from drier 50 (where the extrudate catalyst form is desired) are contacted in the extraction zone, or extractor 80, with fresh solvent to extract the polymer. The extraction can be done batchwise or continuously, preferably continuously. Extraction is suitably accomplished in a preferred embodiment by use of a moving bed extractor wherein the solids are introduced into the top of a column, and hot solvent is introduced into the bottom of the column. Suitably, the fresh solvent is introduced at temperature ranging from about 140° F. to about 285° F., or preferably from about 175° F. to about 230° F. Preferably, the solvent is introduced at a temperature just below, or at its boiling point. Hot solvent is removed from the top of the column, and the extracted boehmite solids are removed from the bottom of the column.

In any event, as schematically depicted in FIG. 1, the polymer containing solvent is passed into a distillation column 100, a polymer or polymer concentrate being separated and removed from the bottom of the column 100 and recycled to the blender 10. A solvent and water mixture, taken from the overhead of column 100, is passed to a stripper 90 for removal of water, and the dehydrated polymer-denuded solvent is recycled to extractor 80.

Various solvents are suitable for the extraction of the polymer and water from the boehmite spheres. The solvent employed is one which is soluble in water, and which is capable of dissolving the polymer from the spheres. It is also desirable that the solvent be one which can be desiccated, or one from which the water can be easily stripped. Suitably, also, it is one which boils within a range of from about 140° F. to about 285°

F., preferably from about 175° F. to about 230° F. Low molecular weight alcohols are a particularly preferred class of solvents, preferably those which contain from 1 to about 6 carbon atoms, more preferably from about 3 to about 5 carbon atoms, in the total molecule. The monohydric alcohols are preferred. Other solvents which may be employed are ethers, aldehydes, ketones, halogenated hydrocarbons, e.g., chlorinated hydrocarbons, and the like, generally within about the same molecular weight range as the alcohols. In extraction with the low molecular weight alcohols, e.g., methanol, ethanol, isopropanol, n-propanol, 1-butanol, amyl alcohol and the like, generally from about 70 to about 95 weight percent of the polymer is recovered.

The spheres, or extrudates, on egress from the extractor 80 are dried to remove the solvent, suitably at ambient temperatures or at temperatures ranging from about 100° F. to about 200° F., preferably from about 125° F. to about 175° F. Suitably, the spheres, or extrudates, are dried in circulating air, in vacuum, microwave oven, or the like, at least for a time sufficient to remove surface liquid.

The surface dried spheres, or extrudates, are then calcined as in a first calciner 110 to convert the boehmite to gamma alumina. In the calcination, it is required to raise the temperature of the dried spheres to at least about 1000° F. in an atmosphere of nitrogen or other nonreactive medium, but preferably the calcination is conducted in an atmosphere of air. If air is not employed initially, then a terminal step must be employed wherein the catalyst is heated in air at a temperature of at least about 1000° F., preferably from about 1200° F. to about 1400° F. It is found that gamma alumina is readily formed by raising the temperature from ambient to about 1000° F., or higher, at a rate in excess of about 2° F./minute, preferably from about 3° F./minute to about 5° F./minute. After calcination temperature is reached, the temperature is maintained for periods ranging from about 10 minutes to about 6 hours, from about 2 to about 4 hours being typical, preferably the alumina being calcined in air for the entire period.

The gamma alumina sphere, or extrudate, if a metal hydrogenation component, or components, has not already been added during precipitation or in the blender 10, is next composited with a metal hydrogenation component, or components, e.g., as by impregnation within an impregnation stage 120, or series of such stages. The finished catalyst is thus comprised of a composite of a refractory inorganic support material, preferably a porous inorganic oxide support with a metal or compound of a metal, or metals, selected from Group VIB or Group VIII, or both, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals. Preferred catalysts are constituted of an admixture of cobalt and molybdenum, but in some cases the preferred catalysts may be comprised of nickel and molybdenum. The nickel-molybdenum catalyst possesses very high hydrogenation activity and is particularly effective in reducing Con. carbon. Other suitable Group VIB and VIII metals include, for example, chromium, platinum, palladium, iridium, osmium, ruthenium, rhodium, and the like. The inorganic oxide support is preferably stabilized with silica in concentration ranging from about 0.1 to about 20 percent, preferably from about 10 to about 20 percent, based on the total weight (dry basis) alumina-silica composition (inclusive of metal components).

Particularly preferred catalysts are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable alumina support. A particularly preferred support comprises alumina containing from about 10 to about 20 percent silica. The catalyst is sulfided to form the most active species.

The Group VIB and Group VIII metal components, admixed one component with the other or with a third or greater number of metal components, can be composited or intimately associated with the porous inorganic oxide support or carrier suitably in impregnation zone 120 by impregnation of the support with the metals, e.g., with the alumina, by an "incipient wetness" technique, or technique wherein a metal, or metals, is contained in a solution, preferably alcohol, in measured amount and the entire solution is absorbed into the support and subsequently dried and calcined to form the catalyst. The amount of solution to be employed in such recipe (measured in cubic centimeters, cc) can be determined quite closely by multiplying the pore volume (PV) of the support to be impregnated by the weight of the support, which product is then multiplied by a factor of 1.6. In this case, the preferred solvent is methanol. Other solvents, such as water, isopropanol and the like, can be used.

A more preferred method of impregnation, however, requires about three times (3X) the volume of solution as required for impregnation by the incipient wetness technique. By a threefold increase in the volume of solution used for the impregnation, more time is allowed for the diffusion of the metals into the pores. Better dispersion of the metals throughout the catalyst is obtained, and there is far less "capping off" or closure of the pores by metal deposits formed at pore entrances.

The metal impregnated support is then again dried, e.g., at temperatures ranging from about 150° F. to about 300° F., preferably from about 175° F. to about 225° F. as in circulating air, vacuum oven, microwave oven, or the like, and again calcined as in calciner 130. Suitably, the calcination is conducted at temperatures ranging above about 1000° F., preferably from about 1200° F. to about 1400° F. in air. The catalysts thus formed are particularly suitable for use in hydroconversion processes as fixed beds and ebullating beds, but can be used in slurry form. When used in the form of fixed beds, the particle size diameter of the catalysts generally ranges from about 1/32 to about ⅛ inch, preferably about 1/16 inch. When used as ebullating beds, the catalyst generally range about 1/32 inch diameter and smaller. The bulk density of the catalyst generally ranges from about 0.2 to about 0.6 g/cc, preferably from about 0.2 to about 0.5 g/cc, depending on particle size.

The invention will be more fully understood by reference to the following selected nonlimiting examples and comparative data which illustrate its more salient features. All parts are given in terms of weight units except as otherwise specified.

EXAMPLES 1–4

Approximately 10 kg of aluminum sulfate was dissolved in 83.3 kg of deionized $H_2O$, and the solution filtered. A sodium aluminate slurry was prepared by mixing 3.4 kg of NaOH with 3.3 kg of aluminum trihydrate. The slurry was then cooled and diluted with 166.7 kg of water, and 0.3 kg of tetraethylorthosilicate was added to the aluminum sulfate solution. The aluminum sulfate solution was then added slowly to the sodium aluminate slurry at 50° F. The addition was discontinued at pH = 10. The slurry was then heated to 120° F. and filtered to recover the gel. The gel was reslurried with deionized water and washed until the $Na_2O$ content of the gel was less than 0.1 wt. %, and $SO_4$ less than 3 wt. %.

The hydrogel was then divided into several portions, and the portions of hydrogel were each then treated, or peptized, with portions of acetic acid in varying concentrations at 77° F. One portion of the hydrogel (Sample No. 676123) was thereafter simmered for 2 hours at 203° F. The acid treated portions, inclusive of one portion (Sample No. 676127) which was not acid treated for use as a control, were then blended with 1.5 g. of polyethylene glycol (PEG: 285–315 mol. wt.)/g. $Al_2O_3$, and then dried at ambient temperature. The material was broken into granules of 5 mm. diameter or less and then extracted with isopropyl alcohol at 176° F. to remove the PEG. The portions of material were again dried at 248° F., and then calcined at 940° F. to form gamma alumina. The several portions of alumina were then analyzed to determine surface area (SA) in $m^2/gm$, pore volume (PV) in cc/gm, and from these data the average pore diameters were determined; the results being given in Table I. Additionally, each of the specimens were subjected to Digisorb analysis to determine the distribution of pore size diameters as percent pore volume in terms of pores ranging from 0–50Å, 100–200Å, 150–250Å, 175–275Å, 300Å+ and 350Å+, respectively, with the results being given in Table II.

TABLE II-continued

| PSD, %PV in[1] | 676123 | 676124 | 676125 | 676126 | 676127 |
|---|---|---|---|---|---|
| 300Å+ | 0.5 | 1.6 | 0.5 | 0.7 | 2.7 |
| 350Å+ | 0.4 | 1.3 | 0.4 | 0.5 | 2.4 |

[1]Measured by nitrogen desorption isotherm, wherein the sample is such rated with nitrogen at its normal boiling point and the quantity desorbed is measured at various pressures. Technique is described by the deBoer, J. H. et al, J. Catalysis Vol. 3, 32–7 (1964) and Vol. 4, 643–8 (1965). Analysis were done on Micromeritics Instrument Corporation Digisorb 2500 Automatic Multi-gas, Surface-area and Pore-volume Analyzer.

These data clearly show that the objective of producing high pore volume in the 150Å–200Å pore diameter range, with consistency, is readily attained, the acetic acid treatment also improving PEG response. All of the acetic acid treated portions of hydrogel had significantly superior pore structure than the control, or hydrogel specimen which was not acid treated.

It is apparent that various modifications and changes can be made without departing the spirit and scope of the present invention.

Pore size distributions, as percent of total pore volume, for purpose of the present invention are measured by nitrogen adsorption wherein nitrogen is adsorbed at various pressures using the Aminco Adsorptomat Cat. No. 4-4680, and multiple sample accessory Cat. No. 4-4685. The detailed procedure is described in the Aminco Instruction Manual No. 861-A furnished with the instrument. A description of the Adsorptomat prototype instrument and procedure is given in Analytical Chemistry, Vol. 32, page 532, April, 1960.

An outline of the procedure is given here, including sample preparation.

From 0.2 to 1.0 g of sample is used and the isotherm is run in the adsorption mode only. All samples are placed on the preconditioner before analysis where they are out-gassed and dried at 190° C. under vacuum ($10^{-5}$ Torr) for 5 hours. After pretreatment, the weighed sample is charged to the Adsorptomat and pumped down to $10^{-5}$ Torr. At this point, the instrument is set in the automatic adsorption mode to charge a standard volume of gas to the catalyst. This is done by charging a predetermined number of volumes as doses and then allowing time for adsorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibration are continued

TABLE I

PREPARATION OF LARGE-PORE ALUMINAS

| Sample No. | Treatment[1] | Composition (Dry Basis) $Al_2O_3$ | Slurry Composition Wt. % Solids | Polymer/ $Al_2O_3$ | Surface Area ($m^2$/g.) | Pore Volume (cc/g) | 4 PV/SA (Å) |
|---|---|---|---|---|---|---|---|
| 676123 | 3.6 HoAC.at 203° F | 100g | 5.7 | 1.5 | 439 | 1.68 | 153 |
| 676124 | 3.6 HoAC.at 77° F | 100g | 5.7 | 1.5 | 468 | 2.10 | 179 |
| 676125 | 7.2 HoAC.at 77° F. | 100g | 5.7 | 1.5 | 474 | 2.18 | 184 |
| 676126 | 3.6 HoAC.at 77° F | 100g | 5.7 | 1.5 | 495 | 2.18 | 176 |
| 676127 | None | 100g | 5.7 | 1.5 | 502 | 2.56 | 204 |

[1]g acetic acid/100 g $Al_2O_3$.

TABLE II

| PSD, %PV in[1] | 676123 | 676124 | 676125 | 676126 | 676127 |
|---|---|---|---|---|---|
| 0–50Å | 4.3 | 2.9 | 3.1 | 2.8 | 5.3 |
| 100–200Å | 80.1 | 80.1 | 81.2 | 83.0 | 65.1 |
| 150–250Å | 18.4 | 44.0 | 19.6 | 31.7 | 32.9 |
| 175–275Å | 2.6 | 16.7 | 3.5 | 10.0 | 17.3 | until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barrett, Joyner, and Halenda method. [Barrett, Joyner, and Halenda, J. Am. Chem. Soc. 73, p. 373.] It is believed that the Barrett, Joyner, and Halenda method is as complete a treatment as can be obtained, based on the assumptions of cylindrical pores and the validity of the Kelvin equation.

In some instances, in obtaining specific data, pore volumes in greater than 100Å diameter pores were measured by mercury injection using a Micromeritics Instrument Co. 50,000 lb. Model Porisimeter. Increments of pore volume were observed at increasing pressure and related to pores being intruded by the equation:

$$PD = -3\sigma \cos \theta$$

where P is the applied pressure, D the diameter of the pore, $\sigma$ the surface tension of mercury, and $\theta$ the contact angle between mercury and the material forming the pore opening. The surface tension of mercury ($\sigma$) was taken to be 474 dynes/cm and the contact angle ($\theta$) as 140°. Such specific measurements provide reasonable correlation with nitrogen adsorption methods.

Having described the invention, what is claimed is:

1. In a process for preparing an alumina for subsequent incorporation with a Group VI-B or Group VIII metal, or both, or alumina precipitated as a hydrogel cogelled with a Group VI-B or Group VIII metal, or both, to form a catalyst, the alumina being precipitated as an alumina hydrogel from a solution which contains a hydrous form of alumina and an anion soluble in an alkaline medium and which forms a soluble aluminum salt, the hydrogel of alumina being precipitated from a solution which contains alumina in concentration ranging from about 1 to about 5 percent, based on the weight of solution, at pH ranging from about 8 to about 12, and at temperatures ranging from about 15° F. to about 120° F., the alumina hydrogel being separated from the solution, the alumina hydrogel being contacted with a solution of a water soluble polymer containing from about 2 to about 24 monomer units from the group consisting of (a) polyethylene glycols, (b) polypropylene glycols, and (c) polyethylene amines sufficient to absorb the polymer into the pores of the alumina hydrogel and displace water from the pores until the weight ratio of polymer:alumina within the hydrogel ranges from about 0.5:1 to about 4:1, the hydrogel being dried, and then calcined to form gamma alumina, the catalyst composite which includes the Group VI-B or Group VIII metal, or both, being characterized, when the catalyst is of size ranging from about 1/50 inch up to 1/25 inch average particle size diameter, as having at least about 15 percent of its total pore volume of absolute diameter within the range of about 150Å to about 250Å; when the catalyst is of size ranging from about 1/25 inch to about ⅛ inch average particle size diameter, as having at least about 15 percent of its total pore volume of absolute diameter within the range of about 175Å to about 275Å; and wherein, in each of these catalysts of differing ranges of particle size distributions, the pore volumes resultant from pores of 50Å, and smaller, are minimized; the surface areas and pore volumes of the catalysts being interrelated with particle size, and pore size distributions, surface areas ranging at least about 200 m²/g to about 600 m²/g with pore volumes ranging from about 0.8 to about 3.0 cc/g (B.E.T.), the improvement comprising contacting, and peptizing the hydrogel of alumina after its precipitation from said solution, and prior to the time that it is calcined and transformed into gamma alumina with an aqueous solution of a monocarboxylic or polycarboxylic acid.

2. The process of claim 1 wherein the monocarboxylic or polycarboxylic acid contains from 1 to about 12 carbon atoms.

3. The process of claim 1 wherein the monocarboxylic or polycarboxylic acid is acetic acid.

4. The process of claim 1 wherein treatment with the monocarboxylic or polycarboxylic acid is employed concurrently with a water wash step to remove other undesired by-product salts.

5. The process of claim 1 wherein treatment with the monocarboxylic or polycarboxylic acid is employed concurrently with the contact of the hydrogel or cogel with the polymer solution.

6. The process of claim 1 wherein the alumina hydrogel is precipitated by combining solutions (a) a first of which contains an alkali metal aluminate and (b) a second of which contains a strong mineral acid or an aluminum salt of a strong mineral acid, the anion portion of which is soluble in the alkaline solution.

7. The process of claim 1 wherein the concentration of alumina contained within the solution wherein the hydrogel is precipitated ranges from about 2 to about 3 percent, based on the weight of the solution.

8. The process of claim 1 wherein the pH of the solution wherein the hydrogel is precipitated ranges from about 9 to about 10.

9. The process of claim 1 wherein the precipitated alumina hydrogel is washed at ambient temperature.

10. The process of claim 1 wherein the hydrogel is washed at temperatures ranging from about 70° F. to about 120° F.

11. The process of claim 1 wherein the water soluble polymer contains from about 4 to about 8 monomer units in the total molecule.

12. The process of claim 1 wherein the polymer displaces water from the pores of the alumina hydrogel until the weight ratio of polymer:alumina within the hydrogel ranges from about 1:1 to about 2:1.

13. The process of claim 1 wherein the catalyst produced is one comprising, when the catalyst is of size ranging from about 1/50 inch up to 1/25 inch average particle size diameter, at least about 20 percent of its total pore volume of absolute diameter within the range of about 150Å to about 250Å; when the catalyst is of size ranging from about 1/25 inch to about 1/8 inch average particle size diameter, at least about 20 percent of its total pore volume of absolute diameter within the range of about 175Å to about 275Å; the surface areas and pore volumes of the catalysts being interrelated with particle size, and pore size distributions, surface areas ranging at least about 250 m²/g to about 450 m²/g, with pore volumes ranging from about 1.1 to about 2.3 cc/g (B.E.T.).

14. The process of claim 13 wherein the catalyst produced is one comprising, when the catalyst is of size ranging from about 1/50 inch up to 1/25 inch average particle size diameter, at least about 45 percent, of its total pore volume of absolute diameter within the range of about 150Å to about 250Å; when the catalyst is of size ranging from about 1/25 inch to about ⅛ inch average particle size diameter, at least about 30 percent, of its total pore volume of absolute diameter within the range of about 175Å to about 275Å; the surface areas and pore volumes of the catalyst being interrelated with particle size, and pore size distributions, surface areas ranging at least about 250 m²/g to about 450 m²/g, with pore volumes ranging from about 1.1 to about 2.3 cc/g (B.E.T.).

15. The process of claim 1 wherein the catalyst is characterized as follows:

| Distribution of Pore Diameters | |
|---|---|
| 1/50 up to 1/25" | |
| 0–50Å | <10% |
| 150–250Å | >15% |
| 350Å+ | <35% |
| Pore Volume, cc/g | 1.1–1.7 |
| Surface Area, m²/g | 320–475 |
| 1/25 up to 1/8" | |
| 0–50Å | <5% |
| 175–275Å | >15% |
| 350Å+ | <40% |
| Pore Volume, cc/g | 1.3–1.9 |
| Surface Area, m²/g | 340–500 |

16. The process of claim 1 wherein the catalyst is characterized as follows:

| Distribution of Pore Diameters | |
|---|---|
| 1/50 up to 1/25" | |
| 0–50Å | <5% |
| 150–250Å | >20% |
| 350Å+ | <30% |
| Pore Volume, cc/g | 1.3–1.9 |
| Surface Area, m²/g | 340–575 |
| 1/25 up to 1/8" | |
| 0–50Å | <4% |
| 175–275Å | >20% |
| 350Å+ | <35% |
| Pore Volume, cc/g | 1.5–2.1 |
| Surface Area, m²/g | 350–600 |

17. The process of claim 1 wherein the catalyst is characterized as follows:

| Distribution of Pore Diameters | |
|---|---|
| 1/50 up to 1/25" | |
| 0–50Å | <1% |
| 150–250Å | >45% |
| 350Å+ | <7% |
| Pore Volume, cc/g | 1.5–2.1 |
| Surface Area, m²/g | 360–600 |
| 1/25 up to 1/8" | |
| 0–50Å | <3% |
| 175–275Å | >30% |
| 350Å+ | <25% |
| Pore Volume, cc/g | 1.8–2.3 |
| Surface Area, m²/g | 370–650 |

18. The process of claim 1 wherein the alumina hydrogel is precipitated by combining solutions (a) a first of which is an aqueous solution of aluminum nitrate to which nitric acid has been added, or an aqueous solution of aluminum chloride and (b) a second of which is ammonium hydroxide.

* * * * *